(12) United States Patent
Finberg et al.

(10) Patent No.: US 6,632,870 B2
(45) Date of Patent: Oct. 14, 2003

(54) FLAME-RETARTED TRANSPARENT PLASTICS

(75) Inventors: Ita Finberg, Beer-Sheva (IL); Lev Utevski, Beer-Sheva (IL)

(73) Assignee: Bromine Compounds Ltd. (IL)

( * ) Notice: Subject to any disclaimer, the term of this patent is extended or adjusted under 35 U.S.C. 154(b) by 0 days.

(21) Appl. No.: 09/725,627

(22) Filed: Nov. 29, 2000

(65) Prior Publication Data

US 2001/0021742 A1 Sep. 13, 2001

Related U.S. Application Data

(63) Continuation-in-part of application No. 09/328,908, filed on Jun. 9, 1999, now abandoned.

(30) Foreign Application Priority Data

Jun. 11, 1998 (IL) .................................................. 124868

(51) Int. Cl.$^7$ .................................................. C08K 5/02
(52) U.S. Cl. .................. 524/464; 524/465; 524/467
(58) Field of Search ................................. 524/464, 465, 524/467, 470; 570/210, 183

(56) References Cited

U.S. PATENT DOCUMENTS

| | | | |
|---|---|---|---|
| 3,161,692 A | | 12/1964 | McLaughlin et al. ....... 260/668 |
| 5,239,021 A | * | 8/1993 | Peled et al. .................. 525/468 |
| 5,679,736 A | * | 10/1997 | Shorr .......................... 524/464 |
| 5,939,593 A | * | 8/1999 | Fujioka et al. ............... 570/183 |

FOREIGN PATENT DOCUMENTS

EP    0571036 A1    11/1993

OTHER PUBLICATIONS

Modern Plastics Encyclopedia, Mc–Graw–Hill, New York, NY pp. 31, 40, 44, 46 and 74, 1968.

* cited by examiner

*Primary Examiner*—Edward J. Cain
*Assistant Examiner*—Katarzyna W Lee
(74) *Attorney, Agent, or Firm*—Lerner, David, Littenberg, Krumholz & Mentlik, LLP

(57) ABSTRACT

Flame-retarded transparent plastic compositions comprising polyhalgenated trimethylphenyl indan. The polyhalogenated trimethylphenyl indan is a mixture of polyhalogenated trimethylphenyl indanes having each 3 to 9 halogen atoms. The halogen may be bromine or a mixture of bromine and chlorine. The transparent plastic is selected from polycarbonate, polymethylmethacrylate, and polystyrene. The polyhalogenated trimethylphenyl indan is present in an amount of up to about 40% by weight. The transparent plastic flame-retarded material is prepared by mixing the plastic matrix with a flame-retardant effective amount of a polyhalogenated trimethylphenyl indan.

15 Claims, No Drawings ns
FLAME-RETARTED TRANSPARENT PLASTICS

CROSS-REFERENCE TO RELATED APPLICATIONS

The present application is a continuation-in-part of U.S. patent application Ser. No. 09/328,908, filed Jun. 9, 1999 now abandoned.

BACKGROUND OF THE INVENTION

This invention relates to new flame-retarded transparent plastics. More specifically, the invention relates to the use of polyhalogenated trimethylphenyl indanes in certain polymeric matrices to obtain transparent plastic compositions.

Flame retardants (FR) are the most important family of plastic additives. Synthetic polymers and copolymers are often compounded with flame retardant compounds (FR) in order to improve their FR properties. Typical FRs comprise inorganic and organic compounds, particularly aromatic compounds. Halogenated compounds are the most effective, and bromine is often the preferred halogen. The addition of FR compounds also affects the mechanical properties of the plastic material, often negatively.

European Patent No. 571036, the description of which is incorporated herein by reference, claims thermally stable flame retardants which also impart good impact properties. The flame retardants of said application are additives of polyhalogenated trimethylphenyl indanes.

The preparation of 1,1,5-trimethyl-3-phenyl indan (TMPI) is disclosed in DE 2,906,294, DE 2,659,597 and U.S. Pat. No. 3,161,692.

Providing flame retarded, transparent plastic materials is an important goal. However, most FR materials available in the art present severe drawbacks. For instance, some of them are based on brominated diphenyloxide nuclei (such as, decabromodiphenyl oxide). Other FR compounds cannot be incorporated in sufficient amounts in transparent polymeric matrices without severely affecting the transparency of the resulting composition. The combination of FR compound and transparent polymeric matrix is critical for providing transparent flame retarded compositions. Thus U.S. Pat. No. 5,239,021 discloses that a combination of polycarbonate matrix with pentabromobenzylmonoacrylate provides transparent plastic material, but combinations of the same polycarbonate matrix with pentabromobenzylpolyacrylate or with brominated polystyrene do not.

It is therefore an object of the present invention to provide transparent, flame retarded, plastic materials comprising transparent polymeric matrices and FR additives.

It is another object to provide such transparent, flame retarded, plastic materials wherein the FR additives overcome the aforesaid drawbacks of prior art additives.

It is a further object of the invention to provide transparent FR thermoplastic compositions containing a very high (greater than 15% by weight) load of FR material. Such compositions are useful in a variety of applications, as will be further described below.

SUMMARY OF THE INVENTION

The invention is directed to flame-retarded transparent plastic compositions comprising polyhalogenated trimethylphenyl indan. According to a preferred embodiment of the invention, polyhalogenated trimethylphenyl indanes having each 3 to 9 halogen atoms are utilized. Also according to a preferred embodiment of the invention, the number of halogen atoms of at least a part of the polyhalogentated trimethylphenyl indan in the mixture is 7 or 8, and the halogen is bromine. Illustrative examples of such polyhalogentated trimethylphenyl indanes are a mixture of hexa-, hepta-, and octabromotrimethylphenyl indan, which mixture is also known as FR-1808 ex Bromine Compounds Ltd.

The halogen can be bromine, or a mixture of bromine and chlorine.

The plastic matrix of the materials that are flame retarded by polyhalogenated trimethylphenyl indan is critical to obtain a transparent final plastic composition. According to the invention, said plastic matrix is chosen from the group consisting of polycarbonate, polymethylmethacrylate, and polystyrene.

The amount of polyhalogenated trimethylphenyl indan which can be present in the plastic material varies with the intended use. For instance, for rendering transparent plastic materials flame-retarded, with acceptable impact strength of the resulting products, total contents of up to about 8% are usually preferred. For other uses, such as for the manufacturing of transparent elements such as lens, light guides, optical fibers and compact disks, having a high refractive index, much higher contents, up to about 40% by weight, are needed, preferably in an amount of up to about 15% by weight.

Throughout this specification, unless specifically otherwise stated, all percentages are by weight.

The invention is also directed to a method for the preparation of transparent, plastic, flame-retarded material comprising mixing the aforesaid polymeric matrices with a flame-retardant effective amount of a polyhalogenated trimethylphenyl indan. According to a preferred embodiment of the invention, the polyhalogenated trimethylphenyl indan is a mixture of brominated derivatives containing 70–75% bromine.

The invention also encompasses the use of polyhalogenated trimethylphenyl indanes in the preparation of transparent plastic materials having a higher refractive index from a polymeric matrix chosen from the group consisting of polycarbonate, polymethylmethacrylate and polystyrene. The mixture of brominated derivatives containing 70–75% bromine, such as FR-1808, is a particularly suitable compound for this purpose, since it permits to provide very high percentages of bromine in the plastic composition, which is needed in order to obtain high refractive indexes. Contents of FR-1808 as high as 40% are easily obtained, with only minor yellowing of the plastic composition, while maintaining complete transparency. These amounts are outstanding, in view of the know art which typically incorporates amounts not higher than 15%. Other additives can also be present, as long as they are not such as to affect the transparency of the flame retarded material.

All the above and other characteristics and advantages of the invention will be better understood through the following illustrative and non-limiting examples of preferred embodiments.

EXAMPLE 1

Tested specimens were prepared according to the following steps:

Plastic pellets of the following polymeric matrices were dried at the appropriate temperature hereinafter specified for each of them:

Polycarbonate (PC)—120° C.

Polymethylmethacrylate (PMMA)—105° C.

Polystyrene (PS)—80° C.

The temperatures used should be those recommended by the manufacturers of the polymers, and the aforesaid temperatures are those recommended by them for the polymers used in this example.

The drying time for all pellets was three hours.

The plastic pellets and FR-1808 powder were then manually mixed and compounded in a twin-screw extruder ex Berstorff at the following temperatures:

PS: 40–80–190–200–210–210–210–210° C.

PMMA: 40–180–190–200–220–220–220–220° C.

PC: 40–180–220–240–260–260–260–260–260° C.

The strands obtained from the extruder were pelletized and the resulting pellets were dried in a circulating air oven.

The pellets were then injection molded in Allrounder 221-75-350 ex. Arburg at temperatures:

PS: 170–210–210–210° C.

PMMA: 180–220–220–220° C.

PC: 220–260–260–260° C.

The compounding as well as the molding temperatures are fixed in each case according to the recommendations of the polymer manufacturer and to the compounding and molding equipment that is intended to be used. The temperatures set forth above are only an example.

The compositions thus obtained were transparent. Their characteristics are given in Table I.

TABLE I

Properties of Transparent, Fire-retarded, Plastic Compositions

| Compositions →<br>Components ↓ | Unit | 1 | 2 | 3 | 4 | 5 | 6 |
|---|---|---|---|---|---|---|---|
| PS 102E ex Carmel Olefin | % | 100 | 85 | | | | |
| PMMA Oroglas V826 ex Rohm & Haas | % | | | 100 | 85 | | |
| PC Makrolon 2405 ex Bayer | % | | | | | 100 | 85 |
| FR-1808 | % | | 15 | | 15 | | 15 |
| Flammability UL-94 | 3.2 mm | NR | V-2 | NR | V-2 | V-2 | V-2 |
| Flammability UL-94 | 1.6 mm | NR | V-2 | NR | V-2 | V-2 | V-0 |
| Izod notched impact (ASTM D-256-81) | J/m | 19 | 25 | 52 | 49 | 780 | 41 |
| MFI (ASTM D-1238-82) | g/10 min | 5 | 13 | 7 | 4 | 19 | 32 |

In the above Table PS, PMMA and PC indicate polystyrene, polymethylmethacrylate and polycarbonate respectively.

EXAMPLE 2

Operating as in Example 1, compositions comprising a polycarbonate polymeric matrix with polybromotrimethylphenyl indan (FR-1808) were compared with compositions comprising two different commercial flame retardants. Tested specimens were prepared according to the following steps:

Plastic pellets drying at temperature 120° C.

The time of drying for all plastics was 3 hours.

Manual mixing of plastic pellets and of FR powder.

Compounding in twin-screw extruder ex Berstorff at temperatures:

40–180–220–240–260–260–260–260–260° C.

All compounds were dried at 120° C. for 3 hours.

Injection molding in Allrounder 221-75-350 ex. Arburg at temperatures:

220–260–260–260° C.

The formulations and the results so obtained are given in Table II.

TABLE II

| Formulations→ | Unit | 1 | 2 | 3 | 4 | 5 | 6 |
|---|---|---|---|---|---|---|---|
| Components↓ | | | | | | | |
| PC Makrolon 2405 ex Bayer | % | 85 | 70 | 60 | 85 | 85 | 100 |
| FR-1808[1] | % | 15 | 30 | 40 | | | |
| Saytex 3010[2] | % | | | | 15 | | |
| F-2400E[3] | % | | | | | 15 | |
| Transparency | | Yes | Yes | Yes | No | No | Yes |

[1] A mixture of Hexa-, hepta-, and octabromotrimethylphenyl indane.
[2] Proprietary FR ex-Albemarle.
[3] Brominated epoxy polymer ex DSBG.

EXAMPLE 3

Operating as in Example 1, Octachlorotrimethylphenyl indan and Pentabromotrimethylphenyl indan were compounded with polystyrene.

The formulation and properties are given in Table III.

TABLE III

| FORMULATION→<br>COMPONENTS↓ | Units | 1 | 2 |
|---|---|---|---|
| PS 102E ex Carmel Olefin | % | 95 | 95 |
| Octachlorotrimethylphenyl indan | % | 5 | |
| Pentabromotrimethylphenyl indan | % | | 5 |
| Transparency | | Yes | Yes |

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A transparent plastic composition consisting essentially of a plastic matrix selected from the group consisting of polycarbonate, polymethylmethacrylate and polystyrene, and a flame retardant comprising at least one polybrominated trimethylphenyl indane.

2. A composition according to claim 1, wherein said flame retardant comprises a mixture of hexa-, hepta, and octabromotrimethylphenylindane.

3. A composition according to claim 1, wherein said flame retardant is present in an amount of up to 8% by weight.

4. A composition according to claim 1, wherein said flame retardant is present in an amount of up to 15% weight.

5. A composition according to claim 1, wherein said flame retardant is present in an amount of up to 40% by weight.

6. A composition according to claim 1, wherein said flame retardant has a bromine content of about 70% to about 7% by weight.

7. A composition according to claim 1, wherein the number of bromine atoms of at least a part of said at least one polybrominated trimethylphenyl indanes is 7 or 8.

8. A method for the production of a transparent plastic composition comprising the steps of:

providing pellets of a plastic matrix selected from the group consisting essentially of polycarbonate, polymethylmethacrylate and polystyrene, mixing said pellets with a powder of a polybrominated trimethylphenyl indane, and compounding said mixture in an extruder.

9. A method according to claim 8, wherein the number of bromine atoms of at least a part of said polybrominated trimethylphenyl indanes is 7 or 8.

10. A method according to claim 8, wherein said polybrominated trimethylphenyl indane comprises a mixture of hexa-, hepta-, and octabromotrimethylphenylindane.

11. A method according to claim 10, wherein said polybrominated trimethylphenylindane is present in an amount of about 8% or less by weight.

12. A method according to claim 10, wherein said polybrominated trimethylphenylindane is present in an amount of about 15% or less by weight.

13. A method according to claim 10, wherein said polybrominated trimethylphenylindane is present in an amount of about 40% or less by weight.

14. A method according to claim 10, wherein said polybrominated trimethylphenylindane has a bromine content of about 70% to about 75% by weight.

15. A method for the production of a transparent plastic composition comprising the steps of:

mixing a polymeric matrix selected from the group consisting of polycarbonate, polymethlymethacrylate and polystyrene, with an amount of polybrominated trimethylphenyl indane effective to render said transparent plastic material flame retarded.

* * * * *

UNITED STATES PATENT AND TRADEMARK OFFICE
CERTIFICATE OF CORRECTION

PATENT NO. : 6,632,870 B2  Page 1 of 1
DATED : October 14, 2003
INVENTOR(S) : Ita Finberg and Lev Utevski It is certified that error appears in the above-identified patent and that said Letters Patent is hereby corrected as shown below:

<u>Column 3,</u>
Line 40, (Table I, column 6), "V-2" should read -- V-0 --.

<u>Column 4,</u>
Line 15, (Table II), "Saytex 3010$^{(2)}$" should read -- Saytex 8010$^{(2)}$ --.

<u>Column 5,</u>
Line 20, "7%" should read -- 75% --.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,632,870 B2  
DATED : October 14, 2003  
INVENTOR(S) : Ita Finberg and Lev Utevski It is certified that error appears in the above-identified patent and that said Letters Patent is hereby corrected as shown below:

<u>Title page, Item [54] and Column 1, line 1,</u>  
Title, "FLAME-RETARTED" should read -- FLAME-RETARDED --.

Signed and Sealed this

Sixteenth Day of August, 2005

JON W. DUDAS  
*Director of the United States Patent and Trademark Office*